United States Patent Office 2,915,361
Patented Dec. 1, 1959

2,915,361

MANUFACTURE OF THIOPHOSPHORYL-CHLORIDE

Florian F. Knotz, Graz, Austria

No Drawing. Application February 10, 1954
Serial No. 409,505

10 Claims. (Cl. 23—14)

This invention relates to an improved method of making thiophosphorylchloride and to an improved catalyst for facilitating the reaction of phosphorus trichloride and sulfur and to a method of making such catalyst.

Among the objects of the present invention are to provide an economical method of making thiophosphorylchloride involving cheap raw materials for both the principal reaction and the catalyst. Another object is to provide a catalyst effective in low concentration and a further object is to provide a catalyst which is active at low temperatures. Still another object of the invention is to provide a method of manufacturing thiophosphorylchloride which is convenient in operation involving simple manipative steps in simple equipment. Other and further objects will be apparent from the detailed description following.

In accordance with this invention it has been discovered that the reaction of phosphorus trichloride and sulfur is facilitated either by heating these starting materials, or by mixing them in the presence of a catalyst formed: (a) By the action of a sulfur halide on aluminum, or (b) by the action of a sulfur halide on aluminum in the presence of thiophosphorylchloride. In case (a) a heating period of about 11–12 minutes is sufficient to combine phosphorus trichloride and sulfur into thiophosphorylchloride. In case (b) the heating period depends upon the stage of the catalyst. Heating the mixture consisting of aluminum, sulfur halide and thiophosphorylchloride for a short time leads to black particles insoluble in thiophosphorylchloride. This catalyst enables the formation of thiophosphorylchloride from phosphorus trichloride and sulfur after a boiling period of 12–60 minutes, according to Examples 2, 3 and 4. On the other hand further heating of the black particles until they dissolve in thiophosphorylchloride leads to the formation of a very powerful catalyst which effects the combination of sulfur and phosphorus trichloride at room temperature. The reaction starts spontaneously in the cold and becomes vigorous at the end so that a slight cooling is required. After distilling thiophosphorylchloride directly from the flash the remaining residue has still a catalystic activity so that a second run can be accomplished (Examples 4 and 5).

It is advantageous to have the aluminum in small pieces, preferably finely divided such as aluminum turnings, granulated aluminum or powdered aluminum. The sulfur halide which gives excellent results, is readily available, and is preferred for reasons of economy is sulfur monochloride.

The experimental evidence indicates that the action of sulfur monochloride on aluminum leads to the formation of compound (black particles) which can be considered as a preliminary stage of a catalyst being very useful for the manufacture of thiophosphorylchloride from phosphorus trichloride and sulfur. This psudo catalyst heated with phosphorus trichloride and sulfur is converted after a short time into a substance soluble in phosphorus trichloride and extremely active for promoting the reaction between phosphorus trichloride and sulfur. For technical and economical reasons it is advantageous to produce the catalyst directly by heating aluminum, thiophosphorylchloride and sulfur monochloride until the preliminary stage of the catalyst has dissolved in thiophosphorylchloride, forming a homogeneous dark liquid of extreme catalytic activity. For the same reasons a concentrated catalyst can be prepared by heating aluminum, sulfur monochloride in presence of thiophosphorylchloride to the said homogeneous dark liquid and after cooling adding to it again aluminum and sulfur monochloride according to Example 6.

The reaction between aluminum and sulfur monochloride is very vigorous and rather difficult to control. Insufficient heating may fail to give the quantity of catalyst required to complete the combination of sulfur and phosphorus trichloride in a reasonable time. On the other hand, too long heating may destroy the catalyst. Since the active catalyst is formed after boiling the black insoluble pseudo catalyst with phosphorus trichloride (more quickly with thiophosphorylchloride), the preparation of thiophosphorylchloride by use of the pseudo catalyst is rather variable as to time of reaction. Therefore, heating the aluminum and sulfur monochloride to the active catalyst stage is advantageous and for this purpose heating in the presence of thiophosphorylchloride in amount sufficient to control the reaction is convenient and constitutes a preferred embodiment of the invention. The same black particles are formed in the first step but further heating converts them into the extremely active soluble catalyst. Examples 2, 3 and 4 illustrate this clearly where variable heating times are required whereas reaction takes place spontaneously in the case of Example 5. It should be noted that formation of the active catalyst in Examples 2, 3 and 4 can also be brought about by further heating of the black particles until they dissolve in thiophosphorylchloride.

The formation of the catalyst is probably a complex reaction in which thiophosphorylchloride seems to participate. For the reaction itself the following formula scheme is proposed: (a) in absence of thiophosphorylchloride; (b) in presence of thiophosphorylchloride. The components (b) lead to the active catalyst of the second equation under (a).

(a)

$S_2Cl_2 + Al \longrightarrow X$ (preliminary stage of the catalyst; pseudo catalyst)

$PCl_3 + S + X \longrightarrow X + PSCl_3 \longrightarrow PSCl_3 \cdot Y$ (active catalyst)

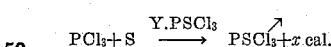
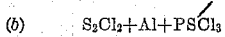

$PCl_3 + S \xrightarrow{Y \cdot PSCl_3} PSCl_3 + x$ cal.

(b)   $S_2Cl_2 + Al + PSCl_3$

Although other ratios are not detrimental, the aluminum and sulfur chloride should be heated in equal molecular proportions for reasons of economy since an excess of either reactant serves no useful purpose. This is a weight ratio of aluminum to sulfur monochloride of approximately 1 to 5. Less sulfur chloride will waste aluminum and not form enough catalyst for a complete reaction. An excess of sulfur chloride does not interfere but is uneconomical and might contaminate the final product. The thiophosphorylchloride may be within the range of 5 to 25 parts by weight and more based on the aluminum. For technical reasons a ratio of 1:25 is preferred. The proportion of the catalyst mixture so prepared expressed as the percent of aluminum preferably is about 1% based on the phosphorus trichloride to be converted per batch. Reaction can be effected with lower amounts but about 1% are required in order to provide a catalyst which still exhibits high efficiency on reuse. Increased amounts, as for example 5% on the phosphorus trichloride, can be used but are unnecessary.

The process is further illustrated by the following examples. The examples illustrate reaction in glass equipment but the reaction can be carried out in either glass lined or iron equipment on a large scale.

Example 1

In a flask fitted with a condenser there are mixed 0.2 gram of finely divided aluminum and 1.0 gram of $S_2Cl_2$. The mixture is heated slightly until the reaction starts after which a vigorous reaction proceeds without the necessity of further heating. A red liquid is formed containing a number of black insoluble particles. After the reaction product is cooled, 4.5 grams of powdered sulfur and 20.0 grams of $PCl_3$ are added and the mixture heated vigorously. After 6 to 8 minutes the black insoluble particles liquefy but do not dissolve in the boiling $PCl_3$. They then suddenly dissolve and the boiling $PCl_3$ is colored a deep dark brown. At the same time the strong boiling of the $PCl_3$ ceases. The overall reaction is finished within 11 to 12 minutes. The reaction product is then isolated by direct distillation from the flask to yield 22.5 grams of $PSCl_3$, B.P. 119–124° C. This represents a yield of 90.7% of the theoretical.

Example 2

A flask fitted with a condenser is charged with 0.2 gram of finely divided aluminum, 1.0 gram of $S_2Cl_2$ and 1.0 gram of $PSCl_3$. The mixture is heated until no further reaction of the aluminum can be detected at which time the reaction product is nearly solid. There is then added 4.8 grams of sulfur and 20.0 grams of $PCl_3$ and the mixture heated strongly. After 45 to 60 minutes boiling the catalyst is dissolved and the boiling mixture turns a deep brown, indicating the end of the reaction. The product is isolated by direct distillation from the flask to yield 23.0 grams of $PSCl_3$, B.P. 120–121° C. Subtracting the $PSCl_3$ charged initially to form the catalyst, this represents a yield of 88.7% of the theoretical.

Example 3

Into a flask fitted with a reflux condenser there is charged 0.2 gram of finely divided aluminum, 1.0 gram of $S_2Cl_2$ and 2.0 grams of $PSCl_3$. The mixture is heated until all the aluminum is covered with a black layer and the reaction mixture evolves white vapors. After cooling there is added 4.8 grams of sulfur and 20.0 grams of $PCl_3$ and the mixture heated to boiling. After 6 to 8 minutes heating the black insoluble substance dissolves in the boiling mixture which latter becomes dark brown. The strong boiling stops, indicating that the reaction is finished. The overall reaction period is in the range of 10 to 12 minutes. The product is isolated by direct distillation from the flask to yield 24.7 grams of $PSCl_3$, B.P. 120–121° C. Subtracting the $PSCl_3$ added initially, this represents a yield of 91.5% of the theoretical.

Example 4

Into a flask fitted with a reflux condenser there is charged 0.2 gram of finely divided aluminum, 1.0 gram of $S_2Cl_2$ and 5.0 grams of $PSCl_3$. The mixture is heated to boiling until black pieces deposit on the boiling liquid which requires about 10 to 12 minutes. After cooling there are added 4.8 grams of sulfur and 20.0 grams of $PCl_3$ and the mixture heated to boiling. After about 10 minutes the black pieces soften and then start to dissolve after about 11 minutes. The reaction is completed after about 13 minutes. Heating is continued for a few minutes and then the product isolated by direct distillation from the flask to yield 28 grams of $PSCl_3$, B.P. 119–122° C. Subtracting the $PSCl_3$ added initially, this represents a yield of 92.7% of the theoretical. To the residue in the flask there are added 2.4 grams of sulfur and 10.0 grams of $PCl_3$ and the mixture again heated to boiling. After 2 to 3 minutes the boiling mixture suddenly becomes dark brown, indicating that the reaction is finished. The product is isolated by direct distillation from the flash to yield 12.4 grams of $PSCl_3$, B.P. 120–122° C. This represents a 100% yield. The procedure is repeated by again adding to the residue 2.4 grams of sulfur and 10.0 grams of $PCl_3$. The reaction is complete after about 10 minutes heating. The product is isolated by direct distillation from the flask to yield 11.2 grams of $PSCl_3$, B.P. 119–121° C. This represents a yield of 90.3% of the theoretical.

Example 5

Into a flask fitted with a reflux condenser there is charged 0.5 gram of aluminum, 2.5 grams of $S_2Cl_2$ and 12.5 grams of $PSCl_3$. The mixture is heated to boiling until the black insoluble pieces initially formed dissolve in the $PSCl_3$ to form a dark brown homogeneous liquid. The black particles are deposited after about 10 minutes heating and dissolve after about 15–16 minutes heating. The liquid catalyst is cooled to room temperature and thereto is added 12.0 grams of powdered sulfur and 50.0 grams of $PCl_3$. No heating is necessary. The mixture quickly becomes warm and starts to boil spontaneously. Slight cooling is usually necessary near the end of the reaction which requires about 2 to 3 minutes overall. After boiling has ceased it is desirable to heat the mixture to boiling for a short time in order to make sure of completion of the reaction. The product is isolated by direct distillation to yield 63.5 grams of $PSCl_3$, B.P. 118–122° C. After substracting the $PSCl_3$ added to form the catalyst, this represents a yield of 90.3% of the theoretical. To the residue in the flask is added 12.0 grams of sulfur and 50.0 grams of $PCl_3$ and the mixture heated to boiling. About 16 minutes are required to finish the reaction. The product is isolated by direct distillation to yield 61.5 grams of $PSCl_3$, B.P. 120–122° C. This represents a yield of 99.2% of the theoretical. The residue which is now of diminished catalytic activity can be removed very easily by short boiling with water which effects decomposition, evolving heat and hydrogen sulfide.

Example 6

Into a container fitted with reflux condenser there is mixed 1 part by weight of granulated aluminum and at least 15 parts by weight of $PSCl_3$ and 5 parts by weight of $S_2Cl_2$. Black particles deposit and the reaction mixture becomes nearly solid. Heating is continued until the solid mass starts to dissolve in $PSCl_3$. Then heating is stopped until the strong boiling of the liquid ceases. Now it is heated again for a short time. The reaction mixture is allowed to cool and then 1 part by weight of aluminum and 5 parts by weight of $S_2Cl_2$ are added. The flask is shaken from time to time. The mixture very quickly becomes hot and after a short time a solid mass deposits. If the temperature falls the reaction mixture is heated again until the solid mass has dissolved in $PSCl_3$ forming a dark brown homogeneous liquid. For this step only a short heating period is necessary. With this amount of concentrated catalyst it is possible to convert in two runs 400 parts by weight of $PCl_3$ and 96 parts by weight of sulfur into $PSCl_3$.

Example 7

The preparation of the active catalyst can also be accomplished in Examples 3 and 4 by further heating of the preliminary catalytic stage (black particles) until it dissolves in $PSCl_3$. In this case the combination of $PCl_3$ and sulfur to $PSCl_3$ takes place under the same conditions as cited in Example 5.

It is intended to cover all changes and modifications of the examples of the invention herein chosen for purposes of disclosure which do not constitute departures from the spirit and scope of the invention.

What is claimed is:

1. The method of making a composition useful for promoting the combination of $PCl_3$ and sulfur which comprises heating finely divided aluminum, $S_2Cl_2$ and $PSCl_3$ until a homogeneous solution forms.

2. The method of making a composition useful for promoting the combination of $PCl_3$ and sulfur which comprises heating finely divided aluminum, $S_2Cl_2$ and $PSCl_3$ in the ratio of substantially 5 parts $S_2Cl_2$ and 5 to 25 parts $PSCl_3$ per each part of aluminum by weight until a homogeneous solution forms.

3. The method of making a composition useful for promoting the combination of $PCl_3$ and sulfur which comprises heating finely divided aluminum, $S_2Cl_2$ and $PSCl_3$ in the ratio of substantially 5 parts $S_2Cl_2$ and 25 parts $PSCl_3$ per each part of aluminum by weight until a homogeneous solution forms.

4. The method of making a composition useful for promoting the combination of $PCl_3$ and sulfur which comprises heating one part by weight of finely divided aluminum, 5 parts by weight of $S_2Cl_2$ and at least 15 parts by weight of $PSCl_3$ until the mass starts to dissolve, adding another part of aluminum and 5 parts of $S_2Cl_2$ and heating until a homogeneous liquid is formed.

5. The composition prepared by the method of claim 3.

6. The composition prepared by the method of claim 4.

7. The method of making $PSCl_3$ which comprises heating in a preliminary step aluminum, a sulfur halide and $PSCl_3$ until a homogeneous liquid product forms and then admixing with sulfur and $PCl_3$, the quantity of $PCl_3$ being within the range of 20 to 100 times the weight of the aluminum and converting the $PCl_3$ to $PSCl_3$.

8. The method of making $PSCl_3$ which comprises heating in a preliminary step, until a homogeneous liquid product forms, finely divided aluminum, $S_2Cl_2$ and $PSCl_3$, the ratio of $S_2Cl_2$ to aluminum by weight being approximately 5 to 1 and the ratio of $PSCl_3$ to aluminum by weight being within the range of approximately 5 to 25 parts $PSCl_3$ per part of aluminum, then admixing with sulfur and $PCl_3$, the quantity of $PCl_3$ being within the range of 20 to 100 times the weight of the aluminum and converting the $PCl_3$ to $PSCl_3$.

9. The process of claim 8 followed by recovering the $PSCl_3$ by distillation and adding to the residue a further quantity of sulfur and $PCl_3$ and converting to $PSCl_3$.

10. The method of making $PSCl_3$ which comprises heating in a preliminary step aluminum and a sulfur halide until a liquid containing black insoluble particles forms, then admixing with sulfur and $PCl_3$, the quantity of $PCl_3$ being within the range of 20 to 100 times the weight of the aluminum, heating until a homogeneous liquid product forms and converting the $PCl_3$ to $PSCl_3$.

References Cited in the file of this patent

UNITED STATES PATENTS

| 2,591,782 | Cook | Apr. 8, 1952 |
| 2,802,717 | Edwards et al. | Aug. 13, 1957 |

OTHER REFERENCES

Mellor: "Comprehensive Treatise on Inorganic and Theoretical Chemistry," 1930, vol. 10, page 642.